(12) United States Patent
Feng et al.

(10) Patent No.: US 11,490,006 B2
(45) Date of Patent: Nov. 1, 2022

(54) PHOTOGRAPHING METHOD AND DEVICE, MOBILE TERMINAL AND STORAGE MEDIUM

(71) Applicant: BEIJING XIAOMI MOBILE SOFTWARE CO., LTD., Beijing (CN)

(72) Inventors: Chaoyu Feng, Beijing (CN); Shilong Ji, Beijing (CN); Lei Lei, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/016,090

(22) Filed: Sep. 9, 2020

(65) Prior Publication Data
US 2021/0306558 A1 Sep. 30, 2021

(30) Foreign Application Priority Data
Mar. 30, 2020 (CN) .......................... 202010236873.8

(51) Int. Cl.
*H04N 5/262* (2006.01)
*H04N 5/232* (2006.01)

(52) U.S. Cl.
CPC ..... *H04N 5/23222* (2013.01); *H04N 5/23219* (2013.01); *H04N 5/23229* (2013.01)

(58) Field of Classification Search
CPC .......... H04N 5/23222; H04N 5/23219; H04N 5/23229
USPC ........................................................ 348/239
See application file for complete search history.

(56) References Cited

U.S. PATENT DOCUMENTS

| | | | | |
|---|---|---|---|---|
| 2003/0231255 | A1* | 12/2003 | Szajewski | G03B 17/00 348/340 |
| 2007/0230823 | A1 | 10/2007 | Weng et al. | |
| 2014/0111632 | A1* | 4/2014 | Huang | H04N 5/2354 348/78 |
| 2015/0029349 | A1* | 1/2015 | Ben Israel | H04N 5/23258 348/208.4 |
| 2016/0014340 | A1 | 1/2016 | Kim et al. | |
| 2016/0037067 | A1* | 2/2016 | Lee | H04N 5/23245 348/208.6 |

(Continued)

FOREIGN PATENT DOCUMENTS

| | | |
|---|---|---|
| CN | 104185981 A | 12/2014 |
| CN | 104346810 A | 2/2015 |

(Continued)

OTHER PUBLICATIONS

Extended European Search Report in the European Application No. 20197118.1, dated Feb. 16, 2021, (8p).

(Continued)

*Primary Examiner* — Usman A Khan
(74) *Attorney, Agent, or Firm* — Arch & Lake LLP (57) ABSTRACT

Provided are a photographing method and device, a mobile terminal and a storage medium. The method includes: responsive to detecting a photographing instruction, continuously acquiring a target number of frames of images meeting a preset photographing parameter, the target number being N and determined by a mobile terminal based on a present photographing scenario and N being a positive integer; and determining a target image according to image quality of the N frames of images and outputting the target image. Through the method, the mobile terminal is more intelligent.

20 Claims, 4 Drawing Sheets

---

Responsive to detecting a photographing instruction, a target number of frames of images meeting a preset photographing parameter are continuously acquired, the target number being N and determined by the mobile terminal based on a present photographing scenario and N being a positive integer — S11

A target image is determined according to image quality of the N frames of images and is output — S12

(56) References Cited

U.S. PATENT DOCUMENTS

2016/0248979 A1   8/2016  Ben Israel et al.
2019/0014275 A1*  1/2019  Zhang .................... H04N 5/232
2020/0068108 A1   2/2020  Dai et al.

FOREIGN PATENT DOCUMENTS

| CN | 105245640  A  | 1/2016 |
| CN | 107770451  A  | 3/2018 |
| EP |   2966855 A2  | 1/2016 |
| EP |   3599760 A1  | 1/2020 |
| WO | 2019091486 A1 | 5/2019 |

OTHER PUBLICATIONS

First Office Action of the Chinese Application No. 202010236873.8, dated Mar. 23, 2022 with English translation, (22p).

* cited by examiner

PHOTOGRAPHING METHOD AND DEVICE, MOBILE TERMINAL AND STORAGE MEDIUM

CROSS-REFERENCE TO RELATED APPLICATION

This application is based upon and claims priority to Chinese patent application No. 202010236873.8, filed on Mar. 30, 2020, the entire contents of which are incorporated herein by reference.

TECHNICAL FIELD

The present disclosure generally relates to the technical field of artificial intelligence, and particularly, to a photographing method and device, a mobile terminal and a storage medium.

BACKGROUND

Mobile terminals have been used more and more in recent years. Photographing with mobile terminals becomes very popular and users prefer better photographic effects on mobile terminals.

When a mobile terminal is used for photographing, a photographing method is adopted for obtaining an image with higher quality, which is: acquiring a fixed number of continuous images, selecting an image with relatively high image quality therefrom and outputting the selected image.

However, requirements of users on photographic quality still cannot be met based on this method. There is a growing need to improve image quality during photographing by mobile terminals.

SUMMARY

The present disclosure provides a photographing method and device, a mobile terminal, and a storage medium.

According to a first aspect of the present disclosure, a method for photographing is provided, which may be applied to a mobile terminal and include:

responsive to detecting a photographing instruction, continuously acquiring a target number of frames of images meeting a preset photographing parameter, the target number being N and determined by the mobile terminal based on a present photographing scenario and N being a positive integer; and determining a target image according to image quality of the N frames of images and outputting the target image.

According to a second aspect of the present disclosure, a device for photographing is provided, which may be applied to a mobile terminal and include a processor and a memory configured to store instructions executable by the processor. The processor is configured to, responsive to detecting a photographing instruction, continuously acquire a target number of frames of images meeting a preset photographing parameter, the target number being N and determined by the mobile terminal based on a present photographing scenario and N being a positive integer; and is further configured to determine a target image according to image quality of the N frames of images and output the target image.

According to a third aspect of the present disclosure, a non-transitory computer-readable storage medium is provided, which has stored instructions therein that, when executed by a processor of a mobile terminal, cause the mobile terminal to implement the method of the first aspect.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
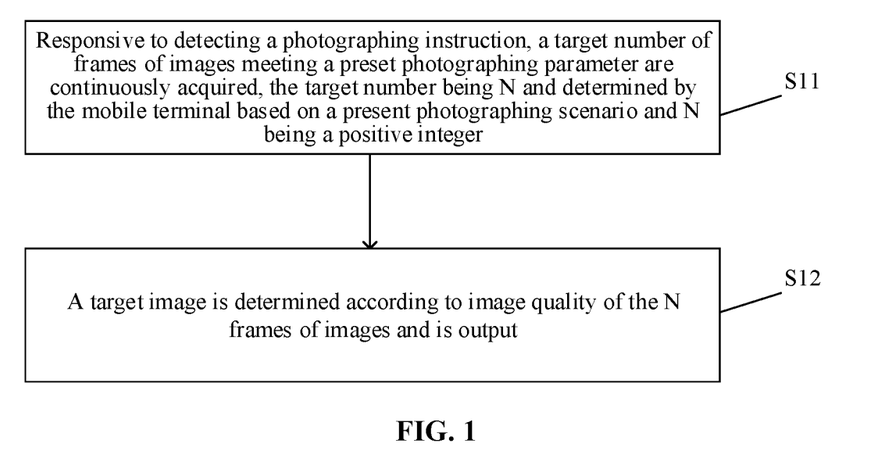
FIG. 1 is a flowchart showing a photographing method according to an embodiment of the present disclosure.

FIG. 1 is a flowchart showing a photographing method according to an embodiment of the present disclosure. As shown in FIG. 1, the photographing method applied to a mobile terminal includes the following operations.

In S11, responsive to detecting a photographing instruction, a target number of frames of images meeting a preset photographing parameter are continuously acquired, the target number being N and determined by the mobile terminal based on a present photographing scenario and N being a positive integer. Here, the preset photographing parameter may include a resolution parameter, an exposure parameter, or other preset parameters. The mobile terminal may continuously acquire N frames of images during a preset time period, where each pair of adjacent frames are acquired with minimum time difference.

In S12, a target image is determined according to image quality of the N frames of images and is output.

In the embodiments of the present disclosure, the mobile terminal may be a mobile phone, a tablet computer, a camera or an intelligent wearable device, etc. The mobile terminal may include an image acquisition module, for example, a front camera or rear camera of a mobile phone, which can take photos.

In S11, the mobile terminal determines the target number N and then continuously acquires N frames of images based on the present photographing scenario. The present photographing scenario of the mobile terminal may include at least one of following parameters:

a movement state of the mobile terminal;
a stationary state of the mobile terminal;
ambient brightness of the mobile terminal; and
an ambient humidity of the mobile terminal.

The mobile terminal may continuously acquire the target number of frames of images meeting the preset photographing parameter in S11 to determine the target image according to the image quality of the N frames of images and output the target image in S12. In some embodiments, a target image with satisfied high quality may be acquired based on a preset number of collected image(s) in a photographing scene. When a current photographing scene is such a scene, the preset number N may be preset to be any constant number such as 1, 2, 3, or a number less than a preset upper limit.

In some embodiments, the number N may be determined or adjusted based on the situation of a current photographing scene each time. In an implementation, a target image with satisfied high quality may be acquired based on more collected images in an undesired photographing scene, for example, the number N might be 3 or more. While, in a desired photographing scene, a satisfied target image may be acquired based on less collected images, for example, the number N may be 2 or even 1.

In the embodiments of the present disclosure, the acquired target number of frames of images need meet the preset photographing parameter, where the photographing parameter may include a resolution parameter or an exposure parameter, etc. Acquisition conducted under the condition that the preset photographing parameter is met is favorable for improving the image quality of the acquired images.

In an embodiment, the operation that the target number of frames of images meeting the preset photographing parameter are continuously acquired may include that:

the target number of frames of images are continuously acquired using the same exposure parameter.

In some embodiments, the target number of frames of images may be continuously acquired using the same exposure parameter, namely the images may be acquired under the same exposure condition. The exposure parameter may include an aperture parameter, a shutter parameter, a photosensitivity parameter and the like. The aperture parameter may include an aperture diameter. The shutter parameter may include a shutter switching rate. The photosensitivity parameter may include an ISO value, and the ISO value may be adjusted by adjusting a photosensitive spot or a photosensitivity of a light sensor. The exposure parameter may impact photographic brightness to further impact the quality of an image obtained by photographing. In an example, when brightness is too low, a resolution of an image may be impacted; and when brightness is too high, color imbalance of an image and the like may be caused by overexposure.

According to the present disclosure, the same exposure parameter is used when the target number of frames of images is acquired, so that the image quality of the N frames of images is comparable when the target image is subsequently determined according to the image quality of the N frames of images, and the determined target image is more accurate.

The operation in S12 that the mobile terminal outputs the target image may include that the mobile terminal displays or transmits a target object to another electronic device, and may further include that the mobile terminal saves the target object.

In an embodiment, S12 includes that:

an image with highest image quality is selected as the target image according to the image quality of the N frames of images and is output; or, M frames of images with highest image quality are selected and fused according to the image quality of the N frames of images to generate and output the target image, M being a positive integer less than N.

In the embodiments of the present disclosure, when the target image is determined according to the image quality of the N frames of images, an image with the highest image quality may be selected as the target image, or M frames of images with the highest image quality may be fused to generate the target image.

When the image with the highest image quality is selected from the N frames of images as the target image for output according to the image quality of the N frames of images, both the image quality and the selection efficiency can be ensured. When the manner of selecting and fusing the best M frames of images to generate and output the target image is adopted, the spatial-temporal correlation and information complementarity of multiple images can be utilized due to image fusion, so that the quality of the target image can further be improved.

When the target image is generated based on image fusion, a conventional image processing manner may be adopted for fusion. In an example, the selected best M frames of images can be decomposed to multiscale image sequences according to a pyramid decomposition method respectively, corresponding layers of pyramids of the M frames of images can be fused according to a rule to obtain a synthetic pyramid, and the synthetic pyramid can be reconstructed according to an inverse process of pyramid generation to obtain the fused target image. In another example, weighted averaging can be directly performed on corresponding pixels of the M frames of images to obtain the fused target image. The image fusion manner is not limited in the present disclosure.

In addition, it is to be noted that, in the embodiments of the present disclosure, the image with the highest image quality or the M frames of images with the highest image quality may refer to one frame of image or M frames of images in the front of the N frames of images sorted from high to low resolutions and/or color saturations of the images.

In an example, when the mobile terminal acquires the images in the movement state, blurred images are more likely to be acquired due to the impact of movement, compared with the condition that the mobile terminal acquires the images in the stationary state. When the ambient brightness of the mobile terminal is relatively low, blurred images are more likely to be acquired due to high noise interference, compared with the condition that the mobile terminal acquires the images in a high-brightness environment.

In another example, when the ambient brightness of the mobile terminal is excessively high, overexposed images are more likely to be acquired due to the impact of ambient light, compared with the condition that the mobile terminal acquires the images in a low-brightness environment. When the mobile terminal is in a rainy environment with a relatively high humidity, images with better color saturations are more likely to be acquired, compared with the condition that the mobile terminal acquires the images in a dry sunny environment.

Therefore, in the embodiments of the present disclosure, when the mobile terminal is in an acquisition environment where images with relatively poor image quality (blurred, overexposed or with low color saturations) are more likely to be acquired, the target number of the images may be increased to enable the mobile terminal to determine a target image among a relatively large number of images to improve the probability that the image quality of the selected target image is relatively high. When the mobile terminal is in an acquisition environment where images with relatively high image quality (sharp, normally exposed or with high color saturations) are more likely to be acquired, the target number of the images can be reduced to improve the determination efficiency of the target image.

In an embodiment, the photographing scenario may include a movement state or stationary state of the mobile terminal, and the method may further include that:

responsive to that the mobile terminal is in the movement state, N is determined according to a movement speed of the mobile terminal and/or an acceleration of the mobile terminal, a value of N being positively correlated with the movement speed and/or the acceleration; and responsive to that the mobile terminal is in the stationary state, it is determined that N is equal to a preset value.

In the embodiment, the photographing scenario may include the movement state or stationary state of the mobile terminal. When the mobile terminal is in the movement state, as mentioned above, it is likely that the mobile terminal acquires blurred images due to the impact of movement. When the movement speed is higher or the acceleration of the mobile terminal is higher, the probability of acquiring blurred images gets higher. Therefore, in the embodiments of the present disclosure, when the mobile terminal is in the movement state, it can be determined that the number N of the acquired image frames is positively correlated with the movement speed and/or the acceleration. Being positively correlated refers to that, when the movement speed and/or the acceleration are/is higher, the number N of the image frames gets larger.

It is to be noted that, in the embodiments of the present disclosure, the situation that the mobile terminal is in the movement state may be caused by movement (walking or running) of a user of the mobile terminal or by a hand shake of the user of the mobile terminal during photographing or vibration generated when a camera button is pressed. In addition, a movement sensor may be arranged in the mobile terminal. In an example, a triaxial acceleration sensor or a gyroscope may be arranged in the mobile terminal and may obtain the acceleration of the mobile terminal. In another example, an ultrasonic sensor may further be mounted in the mobile terminal, so that the mobile terminal may determine the movement speed of the mobile terminal according to a Doppler frequency shift principle of an ultrasonic signal.

In the embodiment, when the mobile terminal is in the stationary state, N is equal to the preset value. It is to be noted that the preset value is less than the number of image frames determined when the mobile terminal is in the movement speed.

In the embodiment, different determination manners for the number N of the image frames can be determined when the mobile terminal is in the movement state or stationary state. In the movement state, according to the movement speed and/or the acceleration, more detailed determination of the number N of the image frames may further be performed with regard to different movement speeds and/or accelerations. It can be understood that, in this manner, the probability of determining the target image with relatively high image quality can further be improved, and the selection efficiency of the target image also can be ensured.

In some embodiments, the photographing scenario may include ambient brightness of the mobile terminal, and the operation that the number N of the continuously acquired image frames is determined based on the present photographing scenario may include that:

N is determined according to the ambient brightness, N being negatively correlated with the ambient brightness.

In the embodiment, the photographing scenario may include the ambient brightness of the mobile terminal. As mentioned above, under the impact of the ambient brightness, the mobile terminal is likely to acquire blurred images when the ambient brightness is low. The lower the ambient brightness is, the higher the probability of acquiring blurred images is. Therefore, in the embodiments of the present disclosure, the mobile terminal may determine the number N of the image frames according to the ambient brightness, N being negatively correlated with the ambient brightness. Being negatively correlated refers to that, the higher the ambient brightness is, the smaller the number N of the image frames is.

As mentioned above, when the ambient brightness is excessively high, overexposed images are likely to be acquired. Therefore, in the embodiments of the present disclosure, for ensuring both the resolution and exposure of the acquired images, the number N of the image frames may be set to be negatively correlated with the ambient brightness in a preset ambient brightness range.

It can be understood that, the number N of the image frames can be determined according to present ambient brightness under the condition that the ambient brightness is negatively correlated with the number N of the image frames, so that the probability of determining a target image with relatively high image quality can be improved, and meanwhile, the selection efficiency of the target image can be ensured.

In an embodiment, the method may further include that:

a determination manner for the image quality is determined according to the ambient brightness.

S12 includes that:

the image quality of the N frames of images is determined respectively according to the determination manner, and the target image is determined according to the image quality and is output.

In the embodiment, the mobile terminal may also adopt an image quality calculation manner adapted to ambient brightness. In an example, different image resolution calculation manners can be determined according to different ambient brightness. In another example, different image exposure calculation manners can be determined according to different ambient brightness.

The mobile terminal may respectively determine the image quality of the N frames of images according to the determined determination manner for the image quality to determine the target image for output. It can be understood that, in the embodiment, the image quality can be determined according to the present ambient brightness of the mobile terminal. In an example, an image quality determination manner with relatively low calculation complexity can be determined according to ambient brightness, and a determination manner with higher image quality evaluation accuracy can be determined according to present ambient brightness. In this manner, the determination manner for the image quality can be adapted to the present ambient brightness better, and the image quality determination intelligence of the mobile terminal can be improved.

In an embodiment, the operation that the determination manner for the image quality is determined according to the ambient brightness may include that:

responsive to that the ambient brightness is greater than a first brightness threshold, it is determined that the determination manner for the image quality is gradient calculation; or, responsive to that the ambient brightness is less than or equal to a first brightness threshold, it is determined that the determination manner for the image quality is a deep learning network.

In the embodiment, image quality may be determined by, for example, measuring the resolution of an image. When ambient brightness is relatively high, an acquired image can be impacted by noise less, and the image also can be formed relatively stably, so that gradient calculation in an image processing method may be adopted to calculate the resolution of the image. The gradient calculation is to evaluate the resolution of an image based on a grayscale value difference between adjacent pixels of the image. In an example, grayscales in the vicinity of two sides of a boundary of the image are obviously different, namely a grayscale change rate is high. If a grayscale change rate is higher, it is indicated that the resolution of an image is higher.

Exemplarily, the gradient calculation may be Laplace gradient calculation. The mobile terminal may extract a Laplace feature of each frame of image and calculate a variance of the feature. If the variance is greater, it means that an image is more blurred, otherwise the image is sharper. In the embodiments of the present disclosure, the gradient calculation is not limited to the Laplace gradient calculation. For example, a Sobel operator or a Prewitt operator, etc., may also be adopted to calculate an image gradient.

It can be understood that, when the ambient brightness is greater than a first brightness threshold, the overall speed of the mobile terminal in outputting the target image with the highest image quality can be improved by adopting the gradient calculation method with high calculation efficiency to determine the image quality of an image, thereby improving the user experience.

When the ambient brightness is less than or equal to the first brightness threshold, namely the ambient brightness of the mobile terminal is relatively low, the acquired image may have low average brightness and may be greatly impacted by noise. In addition, under a dark light condition, the forming consistency of the image also may be relatively poor due to flashlight, so that effective evaluation cannot be implemented by the conventional image processing method. Therefore, for the dark light condition, a deep learning network is adopted in the present disclosure to reduce the impact of noise or an imaging difference on image quality evaluation. The deep learning network may be a Convolutional Neural Network (CNN), for example, a LeNet or an AlexNet. No limits are made in the embodiment of the present disclosure.

When the deep learning network is adopted for image resolution evaluation, image grayscale information may be adopted as a network input feature, and after processing of multiple convolutional layers, regression can be finally performed by a fully connected layer to output an image resolution value. The greater the value is, the sharper the image is, otherwise the image may be more blurred.

It is to be noted that, in the embodiments of the present disclosure, the deep learning network can be obtained by training a large number of sample images acquired when ambient brightness is less than or equal to the first brightness threshold. When the photographing method is applied to the mobile terminal, the image quality evaluation speed can be increased by use of a Graphics Processing Unit (GPU) or an embedded Neural-network Processing Unit (NPU).

It can be understood that, when the ambient brightness is less than or equal to the first brightness threshold, the image resolution under the dark light condition can be calculated more accurately by adopting a deep learning method to determine the image quality, thereby improving the selection accuracy of the target image.

In an embodiment, the method may further include that:
an image quality screening threshold is determined according to the ambient brightness.

The operation that the target image is determined according to the image quality of the N frames of images and is output may include that:

K frames of images with image quality higher than the image quality screening threshold are screened out of the N frames of images according to the image quality screening threshold, K being a positive integer less than N, and the image with highest image quality is selected from the K frames of images as the target image for output, or, M frames of images with highest image quality are selected from the K frames of images and fused to generate and output the target image, M being a positive integer less than K.

In the embodiment, when the target image in the N frames of images is determined, part of images may be invalid images due to excessively poor image quality, and thus the invalid images may be excluded in advance according to a threshold. Then, the mobile terminal can select an image with the highest image quality from the K frames of images remained after screening as the target image for output, or, select the M frames of images with the highest image quality from the K frames of images and fuse them to generate and output the target image.

It is to be noted that, in the present disclosure, when the image with the highest image quality or the M frames of images with the highest image quality are selected from the K frames of images, bubble sorting may be adopted, for example. No limits are made in the embodiment of the present disclosure.

It can be understood that, in the manner of screening images in advance according to the image quality screening threshold, the number of times of comparison for selecting the target image by a sorting algorithm may be reduced, so that the selection efficiency of the target image is improved.

Furthermore, the image quality screening threshold of the present disclosure may be determined according to the ambient brightness. As mentioned above, different image quality calculation manners may be adopted for different ambient brightness, so that adopting a unified image quality screening threshold for different image quality calculation manners may be not so accurate. It can thus be seen that the selection accuracy of the target image may be further improved by determining the image quality screening threshold according to the ambient brightness.

In an embodiment, the image quality screening threshold may be positively correlated with the ambient brightness.

As mentioned above, when ambient brightness is lower, it is more likely that the mobile terminal is more likely to acquire blurred images. When ambient brightness is higher, sharp images are more likely to be acquired. Therefore, in the embodiment, the selection efficiency of the target image can be reasonably adjusted according to the ambient brightness by determining the image quality screening threshold according to the positive correlation between the image quality screening threshold and the ambient brightness. The image quality screening threshold is positively correlated with the ambient brightness, which refers to that the higher the ambient brightness is, the greater the image quality screening threshold is.

It is to be noted that, in the embodiments of the present disclosure, determination of the image quality screening threshold is not limited to ambient brightness and also can be set according to a photographic mode. In an example, in a portrait mode, a user may focus more on a portrait, so that the image quality screening threshold may be appropriately reduced to improve the probability of selecting the target image.

In an embodiment, the method may further include that:
an ROI in each frame of image is determined based on a set photographic mode; and
image quality of the ROIs in the N frames of images is respectively determined as the image quality of the N frames of images.

In the embodiment, the ROI in each frame of image may be determined based on the set photographic mode. The ROI refers to a key region of concern. In an example, in a face mode, the ROI is a face region. In a plant mode, the ROI is a region occupied by a plant. The ROI may be a partial region of an image.

According to a determined ROI, when the image quality of an image is determined in the present disclosure, the image quality of the ROI rather than the image quality of the whole image is determined. It can be understood that, since the partial region is calculated, the calculated amount for determination of the image quality can be reduced, and the photographing processing time can be reduced. In addition, determining a ROI according to different photographic modes can ensure that the determined ROI matches better with a using scenario, so that the selection accuracy of the target image can be improved.

In an embodiment, the operation that the ROI in each frame of image is determined based on the set photographic mode may include that:
responsive to that the photographic mode is a portrait mode, a face region in each frame of image is detected, and the face region is determined as the ROI; and
responsive to that the photographic mode is a non-portrait mode, a central region of each frame of image is determined as the ROI.

In the embodiment, for the portrait mode, the face region in each frame of image may be detected. In an example, if the mobile terminal adopts an image acquisition module supporting three-dimensional photographing, the face region may be determined according to three-dimensional depth information. A deep learning network may also be adopted. The deep learning network can be obtained by training a large number of images with and without faces. The face region may be detected through the deep learning network.

For the non-portrait mode, the central region may directly be determined as the ROI. A deep learning network may also be adopted. The deep learning network may be obtained by performing region blocking on each sample image in a large number of sample images and performing importance regression on each region. Therefore, when the ROI is detected by the deep learning network, a region with relatively high importance in each frame of image in the N frames of images may be determined as an ROI.

Figure 2:
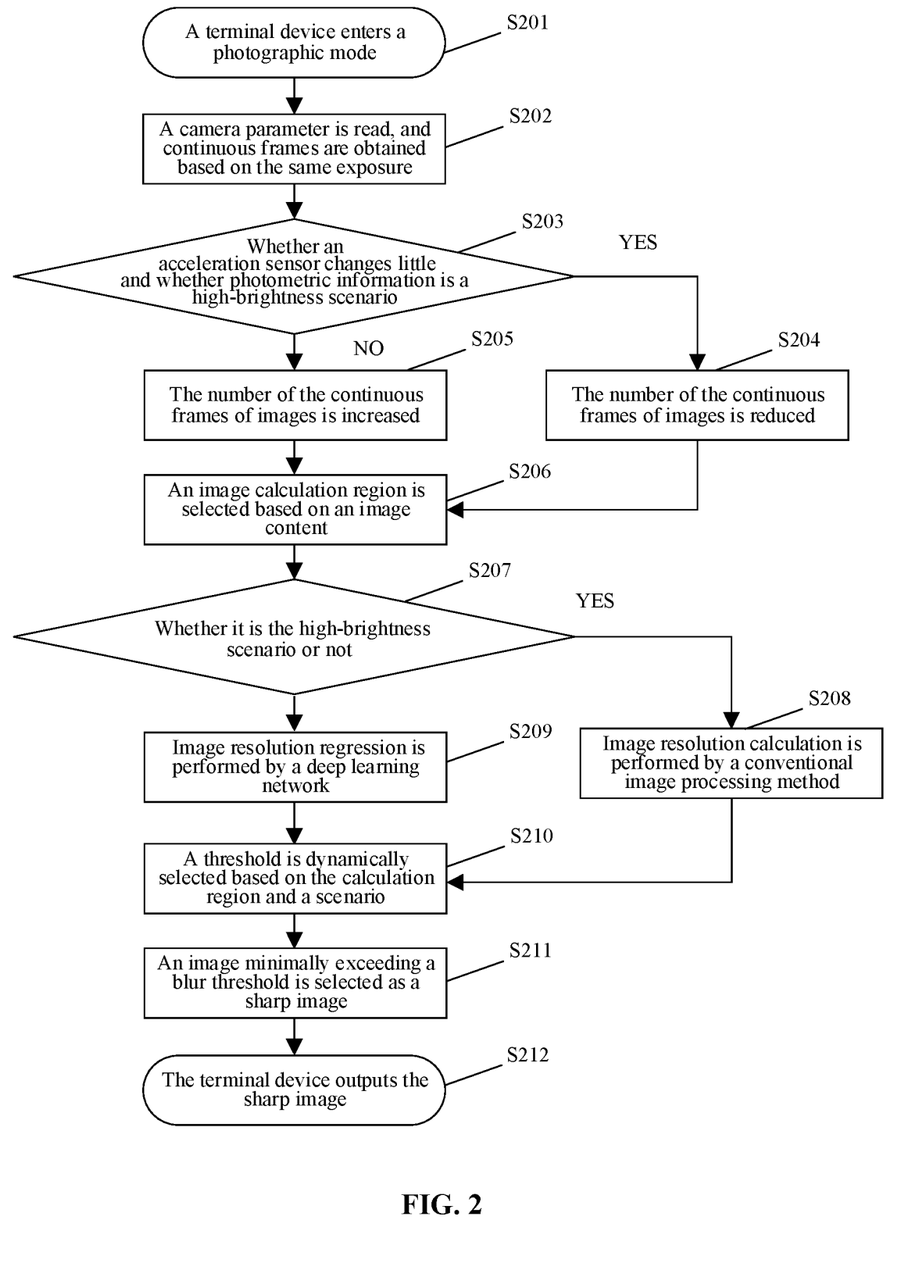
FIG. 2 is an exemplary flowchart showing a photographing method according to an embodiment of the present disclosure.

FIG. 2 is an exemplary flowchart showing a photographing method according to an embodiment of the present disclosure. As shown in FIG. 2, the photographing method applied to a mobile terminal includes the following operations.

In S201, a terminal device enters a photographic mode.

In the embodiment, the terminal device is the mobile terminal. The terminal device enters the photographic mode to prepare for photographing. It is to be noted that the terminal device, after entering the photographic mode, may determine the target number N of continuously acquired frames based on a present photographing scenario.

In S202, a camera parameter is read, and the continuous frames are obtained based on the same exposure.

In the embodiment, obtaining the continuous frames based on the same exposure refers to continuously acquiring the target number of frames of images based on the same preset photographing parameter.

In S203, whether an acceleration sensor changes little and whether ambient light information indicates a high-brightness scenario are judged. If YES, S204 is executed. If NO, S205 is executed.

In the embodiment, whether the terminal device is in a movement state or not may be determined according to a change of output from the acceleration sensor. If the ambient light information indicates the high-brightness scenario, ambient brightness of the terminal device is greater than a first brightness threshold. If the ambient brightness is less than or equal to the first brightness threshold, it is not the high-brightness scenario. If the acceleration sensor changes little and the ambient light information indicates a high-brightness scenario, the image frame number of the acquired images may be reduced; otherwise, if not, the image frame number of the acquired images may be increased.

In S204, the number of the continuous frames of images is reduced.

In the embodiment, reducing the number of the continuous frames of images refers to reducing the number of image frames of the images.

In S205, the number of the continuous frames of images is increased.

In the embodiment, increasing the number of the continuous frames of images refers to increasing the number of image frames of the acquired images.

In S206, an image calculation region is selected based on an image content.

In the embodiment, selecting the image calculation region refers to determining an ROI.

In S207, whether it is the high-brightness scenario or not is judged. If YES, S208 is executed. If NO, S209 is executed.

In S208, image resolution calculation is performed by a conventional image processing method.

In the embodiment, the conventional image processing method may be gradient calculation. Image resolution is for evaluating image quality.

In S209, image resolution regression is performed by a deep learning network.

In the embodiment, performing image resolution regression by a deep learning network refers to determining an image resolution by a deep learning network.

In S210, a threshold is dynamically selected based on the calculation region and a scenario.

In the embodiment, the scenario refers to ambient brightness of the terminal device. Dynamically selecting the threshold refers to dynamically determining an image quality screening threshold.

In S211, an image minimally exceeding a blur threshold is selected as a sharp image.

In the embodiment, selecting the image minimally exceeding the blur threshold as a sharp image refers to selecting an image with highest image quality from images screened according to the threshold as a target image.

In S212, the terminal device outputs the sharp image.

In the embodiment, the operation that the terminal device outputs the sharp image refers to that the terminal device outputs the target image.

It can be understood that, in the embodiment, the terminal device may determine the target number N of the continuously acquired frames according to present acquisition ambient brightness and the movement state of the terminal device and perform image acquisition. Then, when an image with a highest resolution is selected from the N frames of images as the target image for output, resolution calculation may be only performed on a ROI. During resolution calculation, different resolution calculation methods may be adopted according to different ambient brightness. Through the method, the selection accuracy of a sharp image can be enhanced, the calculated amount of the algorithm may be reduced, and the efficiency of the algorithm can be improved.

Figure 3:
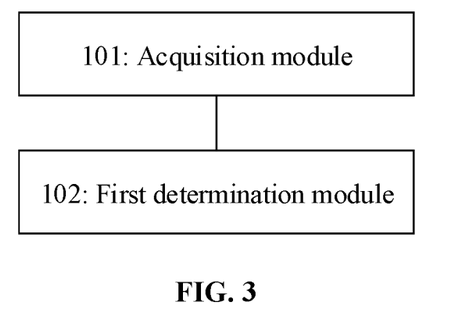
FIG. 3 is a diagram of a photographing device according to an exemplary embodiment.

FIG. 3 is a diagram of a photographing device according to an exemplary embodiment. Referring to FIG. 3, the photographing device includes:

an acquisition module 101, configured to, responsive to detecting a photographing instruction, continuously acquire a target number of frames of images meeting a preset photographing parameter, the target number being N and determined by the mobile terminal based on a present photographing scenario and N being a positive integer; and a first determination module 102, configured to determine a target image according to image quality of the N frames of images and output the target image.

Optionally, the photographing scenario may include a movement state or stationary state of the mobile terminal. The device may further include:

a second determination module 103, configured to, responsive to that the mobile terminal is in the movement state, determine N according to a movement speed of the mobile terminal and/or an acceleration of the mobile terminal, a value of N being positively correlated with the movement speed and/or the acceleration, or, responsive to that the mobile terminal is in the stationary state, determine that N is equal to a preset value.

Optionally, the photographing scenario may include ambient brightness of the mobile terminal. The device may further include:

a third determination module 104, configured to determine N according to the ambient brightness, N being negatively correlated with the ambient brightness.

Optionally, the device may further include:

a fourth determination module 105, configured to determine a determination manner for the image quality according to the ambient brightness.

The first determination module 102 is specifically configured to determine the image quality of the N frames of images according to the determination manner respectively and determine the target image according to the image quality and output the target image.

Optionally, the fourth determination module 105 is specifically configured to determine that the determination manner for the image quality is gradient calculation responsive to that the ambient brightness is greater than a first brightness threshold, and determine that the determination manner for the image quality is a deep learning network responsive to that the ambient brightness is less than or equal to a first brightness threshold.

Optionally, the first determination module 102 is specifically configured to select an image with highest image quality as the target image according to the image quality of the N frames of images and output the target image, or, select and fuse M frames of images with highest image quality according to the image quality of the N frames of images to generate and output the target image, M being a positive integer less than N.

Optionally, the device may further include:

a fifth determination module 106, configured to determine an image quality screening threshold according to the ambient brightness.

The first determination module 102 is specifically configured to select K frames of images with image quality higher than the image quality screening threshold from the N frames of images according to the image quality screening threshold, K being a positive integer less than N; and select the image with highest image quality from the K frames of images as the target image for output, or, select M frames of images with highest image quality from the K frames of images and fuse the M frames of images to generate and output the target image, M being a positive integer less than K.

Optionally, the image quality screening threshold may be positively correlated with the ambient brightness.

Optionally, the device may further include:

a sixth determination module 107, configured to determine an ROI in each frame of image based on a set photographic mode and determine image quality of the ROIs in the N frames of images as the image quality of the N frames of images respectively.

Optionally, the sixth determination module 107 is specifically configured to detect a face region in each frame of image and determine the face region as the ROI responsive to that the photographic mode is a portrait mode, or, determine a central region of each frame of image as the ROI responsive to that the photographic mode is a non-portrait mode.

Optionally, the acquisition module 101 is specifically configured to continuously acquire the target number of frames of images using the same exposure parameter.

With respect to the device in the above embodiment, the specific manners for performing operations for individual modules therein have been described in detail in the embodiment regarding the method, which will not be elaborated herein.

Figure 4:
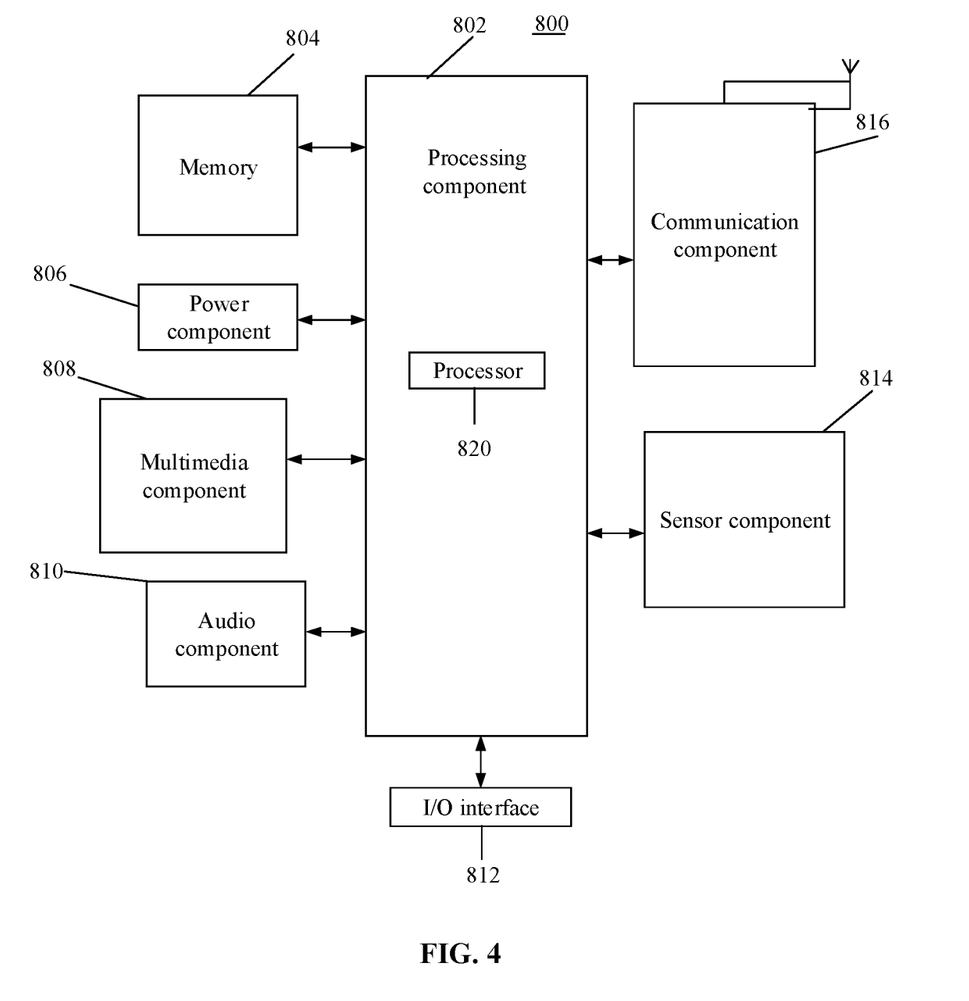
FIG. 4 is a block diagram of a mobile terminal according to an embodiment of the present disclosure.

FIG. 4 is a block diagram of a mobile terminal device 800, according to an exemplary embodiment. In an example, the device 800 may be a mobile phone and a camera.

Referring to FIG. 4, the device 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the operations in the abovementioned method. Moreover, the processing component 802 may include one or more modules which facilitate interaction between the processing component 802 and the other components. For instance, the processing component 802 may include a multimedia module to facilitate interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 is configured to provide power for various components of the device 800. The power component 806 may include a power management system, one or more power supplies, and other components associated with generation, management and distribution of power for the device 800.

The multimedia component 808 may include a screen providing an output interface between the device 800 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is configured to output and/or input an audio signal. In an example, the audio component 810 includes a Microphone (MIC), and the MIC is configured to receive an external audio signal when the device 800 is in the operation mode, such as a call mode, a recording mode and a voice recognition mode. The received audio signal may further be stored in the memory 804 or sent through the communication component 816. In some embodiments, the audio component 810 may further include a speaker configured to output the audio signal.

The I/O interface 812 provides an interface between the processing component 802 and a peripheral interface module, and the peripheral interface module may be a keyboard, a click wheel, a button and the like. The button may include, but not limited to: a home button, a volume button, a starting button and a locking button.

The sensor component 814 may include one or more sensors configured to provide status assessment in various aspects for the device 800. For instance, the sensor component 814 may detect an on/off status of the device 800 and relative positioning of components, such as a display and small keyboard of the device 800, and the sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between the device 800 and another device. The device 800 may access a communication-standard-based wireless network, such as a Wireless Fidelity (Wi-Fi) network, a 2nd-Generation (2G) or 3rd-Generation (3G) network or a combination thereof. In an exemplary embodiment, the communication component 816 receives a broadcast signal or broadcast associated information from an external broadcast management system through a broadcast channel. In an exemplary embodiment, the communication component 816 may further include a Near Field Communication (NFC) module to facilitate short-range communication. In an example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In an exemplary embodiment, the device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including instructions, such as the memory 804 including instructions, and the instructions may be executed by the processor 820 of the device 800 to implement the abovementioned method. In an example, the non-transitory computer-readable storage medium may be a ROM, a Random Access Memory (RAM), a Compact Disc Read-Only Memory (CD-ROM), a magnetic tape, a floppy disc, an optical data storage device and the like.

According to a non-transitory computer-readable storage medium, instructions in the storage medium may be executed by a processor of a mobile terminal to cause the mobile terminal to implement a control method, the method including:

responsive to detecting a photographing instruction, continuously acquiring a target number of frames of images meeting a preset photographing parameter, the target number being N and determined by the mobile terminal based on a present photographing scenario and N being a positive integer; and determining a target image according to image quality of the N frames of images and outputting the target image.

In the embodiments of the present disclosure, a mobile terminal is provided. When detecting a photographing instruction, the mobile terminal continuously acquires a target number of frames of images meeting a preset photographing parameter and determines a target image according to the image quality of the target number of frames of images and output the target image. The target number may be determined by the mobile terminal based on the present photographing scenario. In some cases, if a target image with relatively high image quality can be obtained by taking a small number of images in a first photographing scenario, only a relatively small number of images may need to be collected, thereby reducing the number of calculations and lowering the power consumption. In other cases, if a larger number of images are needed in a second photographing scenario, a relatively large number of images may need to be acquired to ensure the image quality. It can be understood that, with adoption of the solutions of the present disclosure, unnecessary calculation and power consumption can be reduced as much as possible under the condition of ensuring the image quality.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Other implementation solutions of the present disclosure will be apparent to those skilled in the art from consideration of the specification and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for photographing to improve image quality, applied to a mobile terminal, the method comprising:
   determining a target number N based on whether the mobile terminal is in a present photographing scenario, wherein N is a positive integer;
   responsive to detecting a photographing instruction, continuously acquiring N frames of images meeting a preset photographing parameter;
   determining a target image according to image quality of the N frames of images and outputting the target image;
   obtaining ambient brightness of the mobile terminal;
   in response to determining that the ambient brightness is greater than a first brightness threshold, determining that a determination manner for the image quality is gradient calculation; and
   in response to determining that the ambient brightness is less than or equal to the first brightness threshold, determining that the determination manner for the image quality is a deep learning network.

2. The method of claim 1, wherein the photographing scenario comprises a movement state or stationary state of the mobile terminal, and the method further comprises:
   responsive to that the mobile terminal is in the movement state, determining the target number N according to a movement speed of the mobile terminal and/or an acceleration of the mobile terminal, a value of the target number N being positively correlated with the movement speed and/or the acceleration; or,
   responsive to that the mobile terminal is in the stationary state, determining that the target number N is equal to a preset value.

3. The method of claim 1, further comprising:
   adjusting the target number N according to the ambient brightness, the target number N being negatively correlated with the ambient brightness.

4. The method of claim 3,
   wherein determining the target image according to the image quality of the N frames of images and outputting the target image comprises:
   determining the image quality of the N frames of images according to the determination manner respectively; and
   determining the target image according to the image quality and outputting the target image.

5. The method of claim 3, wherein determining the target image according to the image quality of the N frames of images and outputting the target image comprises:
   selecting an image with highest image quality as the target image according to the image quality of the N frames of images and outputting the target image; or,
   selecting and fusing M frames of images with highest image quality according to the image quality of the N frames of images to generate and output the target image, M being a positive integer less than N.

6. The method of claim 5, further comprising:
   determining an image quality screening threshold according to the ambient brightness, wherein determining the target image according to the image quality of the N frames of images and outputting the target image comprises:

screening K frames of images with image quality higher than the image quality screening threshold out of the N frames of images according to the image quality screening threshold, K being a positive integer less than N; and selecting the image with highest image quality from the K frames of images as the target image for output, or, selecting M frames of images with highest image quality from the K frames of images and fusing the M frames of images to generate and output the target image, M being a positive integer less than K.

7. The method of claim 6, wherein the image quality screening threshold is positively correlated with the ambient brightness.

8. The method of claim 1, further comprising:

determining a region of interest (ROI) in each frame of image based on a set photographic mode; and determining image quality of ROIs in the N frames of images as the image quality of the N frames of images respectively.

9. The method of claim 8, wherein determining the ROI in each frame of image based on the set photographic mode comprises:

responsive to that the photographic mode is a portrait mode, detecting a face region in each frame of image, and determining the face region as the ROI; or, responsive to that the photographic mode is a non-portrait mode, determining a central region of each frame of image as the ROI.

10. The method of claim 1, wherein continuously acquiring the N frames of images meeting the preset photographing parameter comprises:

continuously acquiring the N frames of images using a same exposure parameter.

11. A device for photographing to improve image quality, applied to a mobile terminal, the device comprising:

one or more processors; and a memory configured to store instructions executable by the processor, wherein the one or more processors are configured to:

determine a target number N based on whether the mobile terminal is in a present photographing scenario, wherein N is a positive integer;

responsive to detecting a photographing instruction, continuously acquire N frames of images meeting a preset photographing parameter; and determine a target image according to image quality of the N frames of images and output the target image, wherein the one or more processors are further configured to:

obtain ambient brightness of the mobile terminal;

in response to determining that the ambient brightness is greater than a first brightness threshold, determine that a determination manner for the image quality is gradient calculation; and in response to determining that the ambient brightness is less than or equal to the first brightness threshold, determine that the determination manner for the image quality is a deep learning network.

12. The device of claim 11, wherein the photographing scenario comprises a movement state or stationary state of the mobile terminal, and the one or more processors are further configured to:

responsive to that the mobile terminal is in the movement state, determine the target number N according to at least one of a movement speed of the mobile terminal or an acceleration of the mobile terminal, a value of the target number N being positively correlated with at least one of the movement speed or the acceleration, or, responsive to that the mobile terminal is in the stationary state, determine that the target number N is equal to a preset value.

13. The device of claim 11, wherein the one or more processors are further configured to obtain ambient brightness of the mobile terminal and adjust the target number N according to the ambient brightness, the target number N being negatively correlated with the ambient brightness.

14. The device of claim 13, wherein the one or more processors are further configured to:

determine the image quality of the N frames of images according to the determination manner respectively; and determine the target image according to the image quality and output the target image.

15. The device of claim 14, wherein the one or more processors are further configured to:

select an image with highest image quality as the target image according to the image quality of the N frames of images and output the target image, or, select and fuse M frames of images with highest image quality according to the image quality of the N frames of images to generate and output the target image, M being a positive integer less than N.

16. The device of claim 15, wherein the one or more processors are further configured to:

determine an image quality screening threshold according to the ambient brightness; and select K frames of images with image quality higher than the image quality screening threshold out of the N frames of images according to the image quality screening threshold, K being a positive integer less than N; and select the image with highest image quality from the K frames of images as the target image for output, or, select M frames of images with highest image quality from the K frames of images and fuse the M frames of images to generate and output the target image, M being a positive integer less than K.

17. The device of claim 11, wherein the one or more processors are further configured to determine a region of interest (ROI) in each frame of image based on a set photographic mode and determine image quality of ROIs in the N frames of images as the image quality of the N frames of images respectively;

wherein the processor is specifically configured to:

detect a face region in each frame of image and determine the face region as the ROI responsive to that the photographic mode is a portrait mode, or, determine a central region of each frame of image as the ROI responsive to that the photographic mode is a non-portrait mode.

18. The device of claim 11, wherein the one or more processors are further configured to: continuously acquire the N frames of images using a same exposure parameter.

19. A non-transitory computer-readable storage medium, having stored instructions therein that, when executed by a processor of a mobile terminal, cause the mobile terminal to perform acts comprising:

determining a target number N based on whether the mobile terminal is in a present photographing scenario, wherein N is a positive integer;

responsive to detecting a photographing instruction, continuously acquiring N frames of images meeting a preset photographing parameter; and determining a target image according to image quality of the N frames of images and outputting the target image;

obtaining ambient brightness of the mobile terminal;

in response to determining that the ambient brightness is greater than a first brightness threshold, determining that a determination manner for the image quality is gradient calculation; and in response to determining that the ambient brightness is less than or equal to the first brightness threshold, determining that the determination manner for the image quality is a deep learning network.

20. The non-transitory computer-readable storage medium of claim 19, wherein continuously acquiring the N frames of images meeting the preset photographing parameter comprises: continuously acquiring the N frames of images using a same exposure parameter.

* * * * *